US011815160B2

(12) United States Patent
Pan

(10) Patent No.: US 11,815,160 B2
(45) Date of Patent: Nov. 14, 2023

(54) GEARBOX

(71) Applicant: Guotao Pan, Zhejiang (CN)

(72) Inventor: Guotao Pan, Zhejiang (CN)

( * ) Notice: Subject to any disclaimer, the term of this patent is extended or adjusted under 35 U.S.C. 154(b) by 0 days.

(21) Appl. No.: 17/793,368

(22) PCT Filed: Dec. 14, 2020

(86) PCT No.: PCT/CN2020/136018
§ 371 (c)(1),
(2) Date: Jul. 15, 2022

(87) PCT Pub. No.: WO2021/143420
PCT Pub. Date: Jul. 22, 2021

(65) Prior Publication Data
US 2023/0057520 A1 Feb. 23, 2023

(30) Foreign Application Priority Data

Jan. 18, 2020 (CN) .......................... 202010056207.6
Jan. 18, 2020 (CN) .......................... 202020114423.7

(51) Int. Cl.
*F16H 1/28* (2006.01)
*F16H 57/02* (2012.01)
(Continued)

(52) U.S. Cl.
CPC ............... *F16H 1/28* (2013.01); *F16H 57/02* (2013.01); *F16H 57/043* (2013.01);
(Continued)

(58) Field of Classification Search
CPC ........ F16H 57/02; F16H 1/28; F16H 57/0424; F16H 57/0428; F16H 57/0435;
(Continued)

(56) References Cited

U.S. PATENT DOCUMENTS 3,918,857 A * 11/1975 Fitzgerald ............... F02B 71/02
418/196
4,322,988 A * 4/1982 Hill .......................... F16H 3/722
475/108
(Continued)

FOREIGN PATENT DOCUMENTS

CN 103339409 A 10/2013
CN 207796021 U 8/2018
(Continued)

*Primary Examiner* — Derek D Knight

(57) ABSTRACT

A gearbox comprises a differential gear train. The differential gear train comprises a ring gear assembly, a sun gear assembly, and a planetary carrier assembly connected to a planetary gear mechanism. The planetary carrier assembly comprises side plates. The side plates combine with gears to form high-pressure volume units and low-pressure volume units, and a throttle channel is connected between two volume units. The high-pressure volume unit is constructed in a meshing zone of the gears. All high-pressure volume units are connected and communicated with each other by means of a high-pressure oil channel on the planetary carrier assembly. The gearbox can reduce the volume of the high-pressure volume unit, simplify the structure and process, and improve the transmission efficiency and reliability.

4 Claims, 2 Drawing Sheets

(51) Int. Cl.
*F16H 57/04* (2010.01)
*F16H 57/08* (2006.01)

(52) U.S. Cl.
CPC ....... *F16H 57/0424* (2013.01); *F16H 57/082* (2013.01); *F16H 2057/085* (2013.01)

(58) Field of Classification Search
CPC ...... F16H 57/043; F16H 57/082; F16H 3/722; F16H 3/721
See application file for complete search history.

(56) References Cited

U.S. PATENT DOCUMENTS

| | | | |
|---|---|---|---|
| 6,561,943 B1 * | 5/2003 | Bae | F16D 27/115 475/320 |
| 10,731,735 B1 * | 8/2020 | Wagner | F04C 2/105 |

FOREIGN PATENT DOCUMENTS

| | | |
|---|---|---|
| CN | 109372970 A | 2/2019 |
| GB | 465363 A | 5/1937 |
| JP | 05126192 A | 5/1993 |

* cited by examiner

GEARBOX

TECHNICAL FIELD

The invention relates to the field of transmission mechanism, in particular to a gearbox.

BACKGROUND

Previous to the present invention, the applicant applied for "A Continuously Variable Transmission" on the same day, the invention number and the utility model number are respectively 2018101117082 and 2018201977563. The present invention is further improved and optimized on the basis of the previous application.

SUMMARY OF THE INVENTION

In view of the deficiencies or improvements of the previous application, the purpose of the invention is to provide a gearbox, which can further simplify the structure or process, especially improve the transmission efficiency and reliability.

The purpose of the invention is achieved as follows: a gearbox comprises a differential gear train. The differential gear train comprises a ring gear assembly, a sun gear assembly, and a planetary carrier assembly connected to a planetary gear mechanism. The planetary carrier assembly comprises side plates. The side plates combine with gears to form high-pressure volume units and low-pressure volume units, and a throttle channel is connected between two volume units. The high-pressure volume unit is constructed in a meshing zone of the gears. All high-pressure volume units are connected and communicated with each other by means of a high-pressure oil channel on the planetary carrier assembly.

Based on the above scheme, the invention provides the following preferred or optional schemes:

The planetary gear mechanism is connected to the planetary carrier assembly through a one-way bearing, or a one-way bearing is connected between the sun gear assembly and the planetary carrier assembly.

The differential gear train is covered with a casing, and the casing is provided with high and low pressure runners. The sun gear assembly is provided with a low-pressure runner, interconnected with the low-pressure runner on the casing. A high-pressure oil channel on the planetary carrier assembly is interconnected with the high-pressure runner on the casing.

The planetary carrier assembly is provided with liquid outlets.

The side plates are provided with hollow-out parts.

BRIEF DESCRIPTION OF ACCOMPANY DRAWINGS

SPECIFIC EMBODIMENT OF THE INVENTION

Figure 1:
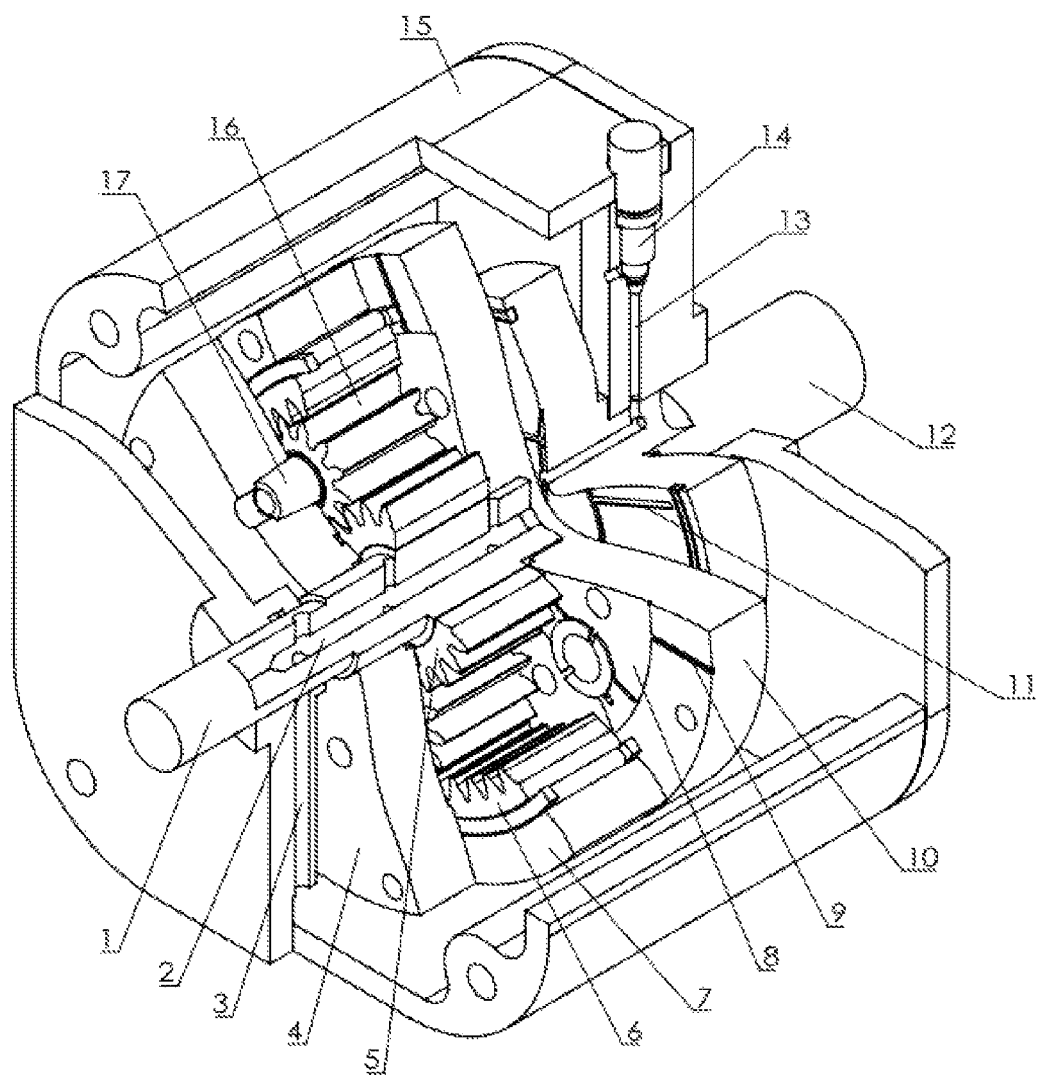
FIG. 1 is a cross-sectional schematic diagram of partial three-dimensional structure of an embodiment according to the invention.
Figure 2:
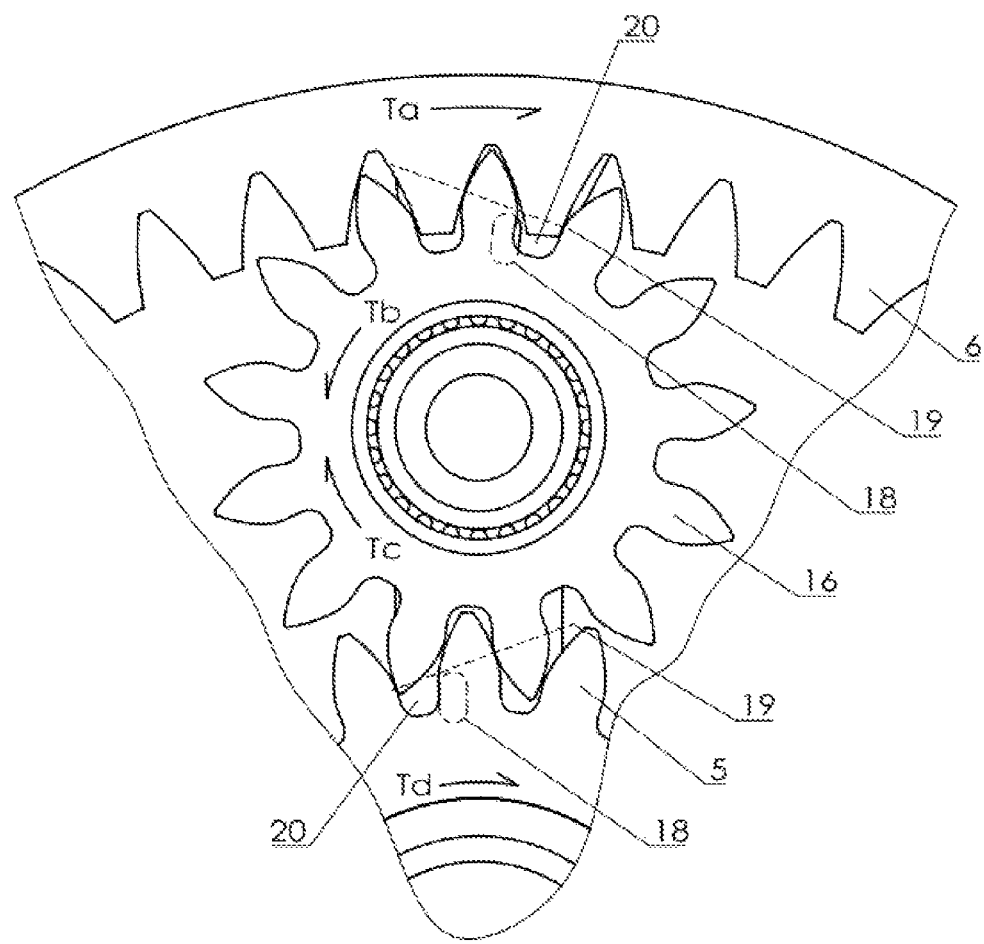
FIG. 2 is an auxiliary illustration diagram the invention.

With reference to the drawings, the embodiments of the invention are as follows: A gearbox comprises a differential gear train. The differential gear train comprises a ring gear assembly, a sun gear assembly, and a planetary carrier assembly connected to a planetary gear mechanism. The planetary carrier assembly comprises side plates. The side plates combine with gears to form high-pressure volume units and low-pressure volume units, and a throttle channel is connected between two volume units. The high-pressure volume unit is constructed in a meshing zone of the gears. All high-pressure volume units are connected and communicated with each other by means of a high-pressure oil channel on the planetary carrier assembly. Referring to FIG. 1, the ring gear assembly is a ring gear 6, the sun gear assembly is a sun gear 5 and an input shaft 1 connected or fixed to it, the planetary carrier assembly comprises side plates, a ferrule 7 and a flange shaft 12, the side plates include a front side plate 4 and a rear side plate 10; the front side plate 4, the rear side plate 10, the ferrule 7 and the flange shaft 12 are fixed to each other with screws, the ring gear 6 is connected to the ferrule 7 through needle roller bearings, and the flange shaft 12 is used to connect the load; the planetary gear mechanism comprises a planetary gear 16, and the planetary gear 16 is sleeved on the planetary gear shaft 17 through a one-way bearing, the planetary gear shaft 17 is inserted between the front side plate 4 and the rear side plate 10; the gears are sun gear 5, planetary gear 16 and ring gear 6, when the gears are accommodated and wrapped in the planetary carrier assembly, the rotation of the driving gears will have the effect of pump and motor, forming two volume units of high and low pressure; a throttle channel is connected between the two volume units, and the throttle channel is used to connect and set a valve such as a throttle valve 14 to adjust the speed; if there is no throttle valve 14, using the internal leakage channel to form the throttle channel can also have a certain automatic speed regulation capability. Referring to FIG. 2 in conjunction with FIG. 1, the high-pressure volume unit is constructed in the meshing zone of the gear, the meshing zone refers to the zone where the two gears rotate from meshing contact to meshing separation, meaning the zone where the gear sweeps between the two ends of the meshing line 19, at this time, the oil trapped zone 20 of the gear is constituted as a high-pressure volume unit; since the planetary gear 16 meshes with the ring gear 6 and the sun gear 5 at the same time, two upper and lower high-pressure volume units will be generated; the two high-pressure volume units communicate with the end face runners 11 on the flange shaft 12 through flow distributing orifices 18 on the side plates; if there are multiple planetary gears 16, all high-pressure volume units are connected to each other and conduct; Except for all high-pressure volume units, all other variable volume zones are formed as low-pressure volume units and are connected to each other.

The transmission principle of the invention is as follows:

Referring to FIG. 2 in conjunction with FIG. 1, when the oil trapped zone 20 using the gear is formed as a high-pressure volume unit, driving the sun gear 5 to rotate will generate pressure and exert pressure on the gears respectively; among them, the two moments Tb and Tc acting on the planetary gear 16 interfere with each other and counteract, the remaining two moments Ta and Td are constituted as static moments acting on the ring gear 6 and the sun gear 5 respectively; since the moment direction is the same, a resultant moment will be generated and applied to the planetary gear shaft 17, the resultant moment will continue to be loaded on the output end, namely the planet carrier assembly, to form a transmission with the continuous rotation of the sun gear 5. It should be noted that the two high-pressure volume units above and below the planetary gear 16 must be under pressure at the same time to be effective, that is, the moments Tb and Tc must interfere to counteract; if only one of the two high-pressure volume units is set to generate pressure, the moments Ta and Tb, or the moments Tc and Td will mostly interfere and the transmission will lose its effect, which is an important reason why all high-voltage volume units need to be connected to each other; in order to achieve this purpose, the flow distributing orifice 18 on the side plate needs to be reasonably arranged in size, position or shape. If a continuous transmission is to be formed, one solution is to make the coincidence of the gears greater than 2. It will be difficult for the sun gear 5 and the planetary gear 16 to be externally meshed, so a solution with thin and high teeth is required; but excess teeth are not conducive to increasing the oil pressure and adjusting the throttle displacement. Another solution is to use multiple planetary gears 16, such as 6 or 8, etc, and reasonably set the number of teeth so that the multiple planetary gears 16 have different phases to form a relay transmission. In this way, the requirements for the coincidence of the gears can be reduced, and the volume change in the meshing zone has both shrinking and expanding process. With this feature, the throttle displacement can be easily adjusted or reduced through the flow distributing orifice 18. When the gear adopts the helical gear structure, the throttle displacement can also be adjusted by changing the helix angle or the height parameter.

The solution of the previous application provides a method for reducing the throttle displacement and improving the transmission efficiency through the displacement difference. After the present invention further improves this solution, the volume of the high-pressure volume unit and the pressure load on the components are greatly reduced. Set the throttle flow be Qw, the total volume of all filled high-pressure oil is V, and define Qw/V as the stiffness coefficient. The smaller the stiffness coefficient, the better the ability to absorb pressure or moment pulsation, but the pressure response will become sluggish and hysteretic after adjusting the throttle opening, hence the larger the stiffness coefficient, the more opposite the effect is. An important disadvantage of the prior application solution is that because the volume of the high-pressure volume unit is too large, it is difficult to increase the stiffness coefficient, resulting in a slow response, but if the throttle amount is increased to improve the response, the transmission efficiency will be reduced. In addition, after the improvement of the present invention, the volume and leakage zone of the high-pressure volume unit are very small, and the throttle displacement can be further reduced under the condition of ensuring the stiffness coefficient. At this time, the influence of the volumetric efficiency becomes limited, and the gear and side plate can be fitted with clearance to reduce the technological or structural requirements of the parts.

The following are descriptions of the preferred or optional solutions of the present invention:

The planetary gear mechanism is connected to the planetary carrier assembly through a one-way bearing, or a one-way bearing is connected between the sun gear assembly and the planetary carrier assembly. Referring to FIG. 1, the planetary gear 16 is sleeved on the planetary gear shaft 17 through a one-way bearing. The purpose is to form a 1:1 transmission through one-way action when the load reversely drives the input shaft 1 to rotate, so as to avoid excessive differential speed between the input end and the output end. At this time, one end of the planetary gear shaft 17 and the side plate can be matched with a tapered surface and fastened with screws to prevent the planetary gear shaft 17 from rotating freely. Obviously, connecting a one-way bearing or an overrunning clutch between the sun gear assembly and the planetary carrier assembly can also achieve the same purpose.

The differential gear train is covered with a casing, and the casing is provided with high and low pressure runners; the sun gear assembly is provided with a low-pressure runner, interconnected with the low-pressure runner on the casing; a high-pressure oil channel on the planetary carrier assembly is interconnected with the high-pressure runner on the casing. Referring to FIG. 1, the outer casing, namely the casing 15, is sleeved on the input shaft 1 and the flange shaft 12, and the casing 15 is provided with high and low pressure runners, namely the high-pressure runner 13 and the low-pressure runner 3; the sun gear assembly includes an input shaft 1, and the input shaft 1 is provided with a low-pressure runner, namely a shaft center channel 2, and is interconnected with a low-pressure channel 3 on the outer casing; the high-pressure oil channel on the planetary carrier assembly, namely the end face runner 11 on the flange shaft 12 and the high-pressure runner 13 on the casing are connected to each other and conduct. Through the above scheme, an external circulation oil circuit can be formed, that is, the low-pressure oil is cooled from the oil pool in the casing 15, filtered, and then flows through the input shaft 1 and sucked into the low pressure volume unit of the gear, the high-pressure oil is collected into the high-pressure runner 13 on the casing through the end face runner 11 on the flange shaft 12, and then falls back to the oil pool after being throttled by the throttle valve 14, the external circulation oil circuit can connect the throttle valve 14 to the casing 15 and control it with a motor. If there is no casing 15, the throttle valve 14 can be installed on the flange shaft 12 and manually controlled to form an internal circulating oil circuit. This scheme is suitable for occasions where the transmission power is relatively small and the working conditions are simple.

The planetary carrier assembly is provided with liquid outlets. Referring to FIG. 1, the liquid outlet is the oil outlet groove 9 or the oil outlet hole provided on the front side plate 4 and the rear side plate 10. When the invention adopts the external circulation oil circuit, the oil sucked from the oil pool can be thrown out through the liquid outlet by the centrifugal force generated by the planetary carrier assembly, to achieve the purpose of oil changing and cooling.

The side plates are provided with hollow-out parts. Referring to FIG. 1, the hollow-out part is the recessed part 8 provided on the front side plate 4 and the rear side plate 10. After reasonable setting of shape and position, on the one hand, it can be used for low-pressure distribution; on the other hand, it is to reduce the contact area or increase the backlash between the side plate and the gear, especially the ring gear 6, thereby reducing the friction loss of the mucus and improving the mechanical efficiency.

The invention is further improved and optimized on the basis of the previous application. The main advantage is that it can greatly reduce the volume of the high-pressure volume unit and reduce the various negative effects caused thereby, which is beneficial to simplify the structure or process, and improve the transmission efficiency and reliability.

The invention claimed is:

1. A gearbox comprises a differential gear train; the differential gear train comprises a ring gear assembly, a sun gear assembly, and a planetary carrier assembly connected to a planetary gear mechanism; the planetary carrier assembly comprises side plates; the side plates combine with gears to form high-pressure volume units and low-pressure volume units, and a channel is connected between two volume units;

the high-pressure volume unit is constructed in a meshing zone of the gears; all high-pressure volume units are connected and communicated with each other by means of a high-pressure oil channel on the planetary carrier assembly;

wherein, the planetary gear mechanism is connected to the planetary carrier assembly through a one-way bearing, or a one-way bearing is connected between the sun gear assembly and the planetary carrier assembly.

2. The gearbox of claim 1, the differential gear train is covered with a casing, and the casing is provided with high and low pressure runners; the sun gear assembly is provided with a low-pressure runner, interconnected with the low-pressure runner on the casing; the high-pressure oil channel on the planetary carrier assembly is interconnected with the high-pressure runner on the casing.

3. The gearbox of claim 1, the planetary carrier assembly is provided with liquid outlets.

4. The gearbox of claim 1, the side plates are provided with hollow-out parts.

* * * * *